(12) United States Patent
Tosatti et al.

(10) Patent No.: US 8,951,630 B2
(45) Date of Patent: Feb. 10, 2015

(54) ULTRA-THIN HYDROPHOBIC AND OLEOPHOBIC LAYER, METHOD OF MANUFACTURE AND USE IN WATCHMAKING AS AN EPILAME AND IN MECHANICAL ENGINEERING AS A BARRIER FILM

(75) Inventors: Samuele Tosatti, Zürich (CH); Stefan Zürcher, Zürch (CH)

(73) Assignees: Rolex S.A., Geneva (CH); Susos, AG, Dubendorf (CH)

( * ) Notice: Subject to any disclaimer, the term of this patent is extended or adjusted under 35 U.S.C. 154(b) by 524 days.

(21) Appl. No.: 13/323,773

(22) Filed: Dec. 12, 2011

(65) Prior Publication Data

US 2012/0088099 A1 Apr. 12, 2012

Related U.S. Application Data

(63) Continuation-in-part of application No. 12/516,231, filed as application No. PCT/CH2007/000601 on Nov. 29, 2007, now abandoned, and a continuation-in-part of application No. 12/516,865, filed as application No. PCT/CH2007/000602 on Nov. 29, 2007, now abandoned, and a continuation-in-part of application No. 12/517,121, filed as application No. PCT/CH2007/000603 on Nov. 29, 2007, now abandoned.

(30) Foreign Application Priority Data

Dec. 1, 2006 (EP) ..................... 06405504
Dec. 1, 2006 (EP) ..................... 06405505

(51) Int. Cl.
| | |
|---|---|
| *B32B 3/00* | (2006.01) |
| *B32B 15/04* | (2006.01) |
| *B32B 18/00* | (2006.01) |
| *B32B 27/06* | (2006.01) |
| *B32B 27/36* | (2006.01) |
| *B32B 27/34* | (2006.01) |
| *B32B 27/38* | (2006.01) |
| *B32B 27/32* | (2006.01) |
| *B05D 1/18* | (2006.01) |
| *C09D 7/12* | (2006.01) |
| *B82Y 40/00* | (2011.01) |
| *B82Y 30/00* | (2011.01) |
| *B05D 5/08* | (2006.01) |

(Continued)

(52) U.S. Cl.
CPC ............ *B05D 1/185* (2013.01); *B05D 5/083* (2013.01); *B82Y 30/00* (2013.01); *B82Y 40/00* (2013.01); *C10M 105/58* (2013.01); *C10M 105/68* (2013.01); *C10M 105/70* (2013.01); *C10M 107/40* (2013.01); *C10M 2205/043* (2013.01); *C10M 2215/0806* (2013.01); *C10M 2215/1023* (2013.01); *C10M 2215/2203* (2013.01); *C10N 2230/06* (2013.01); *C10N 2230/26* (2013.01); *C10N 2240/06* (2013.01); *C10N 2250/12* (2013.01); *C10N 2280/00* (2013.01)
USPC ........... 428/336; 428/413; 428/446; 428/447; 428/457; 428/474.4; 428/480; 428/500; 428/702; 528/363; 528/327; 528/424; 427/430.1; 106/287.23; 106/287.24; 106/287.25

(58) Field of Classification Search
None
See application file for complete search history.

(56) References Cited

U.S. PATENT DOCUMENTS 7,618,937 B2 11/2009 Messersmith et al.
7,622,533 B2 11/2009 Lee (Continued)

FOREIGN PATENT DOCUMENTS

| DE | 238 812 A1 | 9/1986 |
|---|---|---|
| GB | 2199324 A | 7/1988 |
| WO | WO 2007/022645 | * 3/2007 |

OTHER PUBLICATIONS

X. Fan et al., "Surface-initiated polymerization from TiO2 nanoparticle surfaces through a biomimetic initiator: A new route toward polymer-matrix nanocomposites", Composites Science and Technology, Jul. 2006, pp. 1198-1204, vol. 66, No. 9. U.S. Appl. Nos. 12/516,231 and 12/517,121.

(Continued)

*Primary Examiner* — Vivian Chen
(74) *Attorney, Agent, or Firm* — Westerman, Hattori, Daniels & Adrian, LLP

(57) ABSTRACT

The invention relates to a novel ultra-thin hydrophobic and oleophobic layer, formed by self-assembly on a solid substrate surface, of compounds of the general formula

A-B in which
A represents a group of the formula $$\text{HO} \underset{\text{HO}}{\overset{}{\diagup\hspace{-0.3em}\diagdown}} \underset{X}{\overset{Z}{\diagdown\hspace{-0.3em}\diagup}} \text{---CH}_2\text{---CH(Y)---T}$$

in which
  Z represents C or $N^+$,
  X represents C—H or C-L, L being an electron-attracting group selected from F, Cl, Br, I, $CF_3$, $NO_2$ and $N(CH_3)_3^+$,
  Y represents H or $CH_3$, or Y forms a 5- or 6-atom heterocycle with X,
  T represents NH, CO, CONH or $NH_2^+U^-$, $U^-$ being a soluble anion, and B represents an unsubstituted $C_1$-$C_{20}$ linear aliphatic alkyl group, or a $C_1$-$C_{20}$ linear aliphatic alkyl group partially or completely substituted with F,
and a method of preparing this layer and its use as an epilame or barrier film.

35 Claims, No Drawings

(51) Int. Cl.
*C10M 105/58* (2006.01)
*C10M 105/68* (2006.01)
*C10M 105/70* (2006.01)
*C10M 107/40* (2006.01)

(56) References Cited

U.S. PATENT DOCUMENTS

| | | |
|---|---|---|
| 7,858,679 B2 | 12/2010 | Messersmith et al. |
| 7,928,176 B2 | 4/2011 | Pacetti |
| 8,293,867 B2 * | 10/2012 | Messersmith et al. ........ 528/424 |
| 8,551,568 B2 * | 10/2013 | Messersmith et al. ........ 427/352 |
| 2003/0087338 A1 | 5/2003 | Messersmith et al. |
| 2005/0288398 A1 | 12/2005 | Messersmith et al. |
| 2006/0009550 A1 | 1/2006 | Messersmith et al. |
| 2008/0149566 A1 * | 6/2008 | Messersmith et al. ........ 210/702 |
| 2009/0093610 A1 | 4/2009 | Textor et al. |
| 2010/0058553 A1 * | 3/2010 | Marshall et al. ............. 15/327.6 |
| 2010/0075138 A1 | 3/2010 | Tosatti et al. |
| 2010/0098926 A1 | 4/2010 | Tosatti et al. |
| 2010/0330025 A1 * | 12/2010 | Messersmith et al. ..... 424/78.17 |

OTHER PUBLICATIONS

M. Tillwich et al, "Synthetic Lubricants in Precision Mechanisms—an Overview", Journal of Synthetic Lubrication, Jul. 1988, pp. 91-104, vol. 5, No. 2; U.S. Appl. Nos. 12/516,231, 12/516,865 and 12/517,121.
International Preliminary Report on Patentability (Form PCT/IB/373) of International Application No. PCT/CH2007/000601 dated Jun. 10, 2009 with Form PCT/ISA/237; U.S. Appl. No. 12/516,231.
International Preliminary Report on Patentability (Form PCT/IB/373) of International Application No. PCT/CH2007/000602 dated Jun. 10, 2009 with Form PCT/ISA/237; U.S. Appl. No. 12/516,865.
International Preliminary Report on Patentability (form PCT/IB/373) of International Application No. PCT/CH2007/000603 dated Jun. 10, 2009 with Form PCT/ISA/237; U.S. Appl. No. 12/517,121.
International Search Report of PCT/CH2007/000601, Mailing Date of Mar. 31, 2008; U.S. Appl. No. 12/516,231.
International Search Report of PCT/CH2007/000602, Mailing Date of Mar. 27, 2008; U.S. Appl. No. 12/516,865.
International Search Report of PCT/CH2007/000603, Mailing Date of Mar. 31, 2008; U.S. Appl. No. 12/517,121.

* cited by examiner

ULTRA-THIN HYDROPHOBIC AND OLEOPHOBIC LAYER, METHOD OF MANUFACTURE AND USE IN WATCHMAKING AS AN EPILAME AND IN MECHANICAL ENGINEERING AS A BARRIER FILM

This application is a continuation-in-part of U.S. application Ser. Nos. 12/516,231 filed May 26, 2009, abandoned, which is a national stage of PCT/CH2007/000601 filed Nov. 29, 2007, 12/516,865 filed May 29, 2009, abandoned, which is a national stage of PCT/CH2007/000602 filed Nov. 29, 2007, and 12/517,121 filed Jul. 6, 2009, abandoned, which is a national stage of PCT/CH2007/000603 filed Nov. 29, 2007, the respective contents of which are hereby incorporated herein in their entirety.

The present invention relates to a novel ultra-thin hydrophobic and oleophobic layer, formed by self-assembly on a solid substrate surface, of compounds based on catechol, a method of preparing this ultra-thin layer and the use thereof as an epilame in watchmaking, and more generally in mechanical engineering, as a barrier film, an anti-migration film or an anti-wetting film, which will be referred to in the disclosure below as an "epilame" by analogy with the watchmaking sector.

The proper functioning of a watch or mechanical movement depends among other things on its lubrication. The durability of the lubricant depends particularly on its being maintained in the functioning area; however, a drop of lubricant rapidly spreads on a clean part, as observed by all watchmakers. The deposition of a layer of epilame, generally in the form of an invisible hydrophobic and oleophobic molecular layer, enables the spread of the lubricant and its components to be avoided.

The spread of a liquid depends on the forces of interaction between the liquid, the surface and the surrounding air (cf. J. C. Berg, "Wettability", Marcel Dekker, New York, 1993 and A. W. Adamson, "Physical Chemistry of Surfaces", Wiley). The parameter that characterises the forces of interaction between a liquid and air is the surface tension, $\gamma_{LV}$. Similarly, a surface energy $\gamma_{SV}$ is defined between a solid and the surrounding air and a parameter $\gamma_{LS}$ between the solid and the liquid. For a drop of liquid in equilibrium on a surface, Young's equation stipulates that $\gamma_{SV} - \gamma_{LS} = \gamma_{LV} \cdot \cos\theta$, where $\theta$ is the contact angle of the drop of liquid in relation to the surface. Young's equation also shows that, if the surface tension of the liquid is lower than the surface energy, the contact angle is zero and the liquid wets the surface. This is what happens for a lubricant deposited on a clean metallic surface, since a lubricant has a surface tension of 35-40 mN/m whereas a common metallic surface has a higher surface energy.

The surface energy depends on several factors (J. P. Renaud and P. Dinichert, 1956, "Etats de surface et étalement des huiles d' horlogerie", Bulletin SSC III page 681):
- the chemical composition and crystallographic structure of the solid, and in particular of its surface,
- the geometric characteristics of the surface and its roughness (and therefore the defects and/or the state of polishing),
- the presence of molecules physically adsorbed or chemically bonded to the surface, which can easily mask the solid and significantly modify its surface energy.

The surface energy is often determined by the last atomic or molecular layer. The chemical nature of the solid is of little importance in relation to the state of its surface and the contamination covering it. On a clean metallic surface free from organic contamination, the advancing contact angle with a drop of water is less than 10°. With a molecule forming self-assembled monomolecular layers (SAM: Self-Assembled Monolayers) having an —OH functional group (e.g. $HOC_{11}H_{22}SH$), this contact angle is about 30°, whereas it is about 110° for a —$CH_3$ functional group (e.g. $C_{12}H_{25}SH$) and about 118° for a —$CF_3$ functional group (e.g. $C_{10}F_{17}H_4SH$).

The manufacturing techniques used in mechanical engineering, especially watchmaking up to the 1930s left a surface state that minimised the spread of lubricants by means of the presence of a film that lowered the surface energy (M. Osowiecki, 1957, "Un nouvel épilame résistant aux lavages", Bulletin SSC III, page 735). This film disappeared with the improvements made to washing techniques, causing more or less rapid spread of the lubricants. In 1930, P. Woog of the Compagnie Francaise de Raffinage developed an anti-migration product based on stearic acid, which he called "épilame". This was used in various branches of industry until the end of the 1960s. The name remained, and refers in watchmaking to any product used to guarantee that lubricants are retained on a surface.

The deposition of a compound on a functional surface in order to reduce surface energy and to control wettability and adhesion is a fairly widespread process. However, its application as a barrier film or anti-migration film is limited to watchmaking (M. Massin, "Epilames et lubrifiants associés a haute stabilité: propriétés, technologie d' application et résultats en horlogerie", Actes du congrès de Chronométrie Franco-Allemand, page 85, 1970, and "Conception de la lubrification en micromécanique: réalisations nouvelles par préparation des surfaces associées à des fluides silicones", Actes du congrés des Sociétés Allemande et Francaise de Chronométrie, page 95, 1971), the space industry (M. Marchetti, "Aspects globaux et locaux de la mise en oeuvre de la lubrication fluide en ambiance spatiale", doctoral thesis, INSA, Lyon, 2000) and electronics. Common to the first two sectors is the difficulty in replacing a used or exhausted lubricant.

Products based on stearic acid diluted in toluene were used in watchmaking until the 1970s (M. Osowiecki, see reference above, and P. Ducommun, 1956, "Les huiles d' horlogerie synthtéiques", J. Suisse Horl. Bij. 9-10, 117). Research undertaken in the late 1960s led to two important developments. On the one hand, a silicone-based product was developed (P. Massin, see references above) but met with only limited success. On the other hand, fluorinated polymer-based products were introduced during the 1970s and are still in use today.

Currently, the great majority of epilames available on the market, such as Fixodrop FK-BS from Moebius or the Fluorad product range (FC-722 and others) from 3M, consist of a fluorinated polymer dissolved in a perfluorinated solvent.

The deposition or coating of the compound or component on the substrate takes place by dipping the latter in a solution of perfluorinated solvent loaded with polymer. The solvent used is generally tetradecafluorohexane ($C_6F_{14}$) which, once volatilised, is a greenhouse gas since it remains stable in air for 3200 years and has a global warming potential of 7400 $CO_2$ equivalents.

Another object of the invention is to propose compounds which can be used as an epilame and are capable of being fixed to a solid substrate surface.

Another object of the invention is to propose compounds which can be used as an epilame and are capable of being fixed to a solid substrate surface without the use of environmentally toxic fluorinated solvents.

These objects are achieved by the respective features of the present invention.

The invention proposes a novel ultra-thin hydrophobic and oleophobic layer, formed by self-assembly on a solid substrate surface, of compounds based on catechol and a method of preparing this ultra-thin layer which uses a non-fluorinated solvent, such as an environmentally friendly non-fluorinated solvent, e.g. a mixture of water and 2-propanol. Owing to the catechol base of the compounds used, this ultra-thin layer is firmly attached to the solid substrate surface. This ultra-thin layer has satisfactory properties for use as an epilame, in particular an advancing contact angle with water and a spread of a drop, such as a drop of oil, entirely comparable with those of the layer obtained from the commercial reference product, Fixodrop FK-BS.

In some aspects, the invention thus makes an important contribution to the eco-friendly preparation of epilames.

In particular embodiments of the present invention, the catechol-based compounds have the general formula

A-B in which
A represents a group of the formula

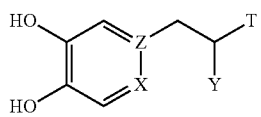

in which
- Z represents C or $N^+$,
- X represents C—H or C-L, L being an electron-attracting group selected from F, Cl, Br, I, $CF_3$, $NO_2$ and $N(CH_3)_3^+$,
- Y represents H or $CH_3$, or Y forms a 5- or 6-atom heterocycle with X,
- T represents NH, NH—CO, NH—CO—NH or $NH_2^+$ $U^-$, $U^-$ being a soluble anion such as e.g. $F^-$, $Cl^-$, $Br^-$, $I^-$, $OH^-$, $NO_3^-$, $HSO_4^-$, $SO_4^{2-}$, $CO_3^{2-}$, $HCO_3^-$ or $SCN^-$, and
- B represents an unsubstituted $C_1$-$C_{20}$ linear aliphatic alkyl group, or a $C_1$-$C_{20}$ linear aliphatic alkyl group partially or completely substituted with F.

The group A is used particularly to enable the attachment of the compounds to the surface of the solid substrate owing to the catechol group and the solubilisation of the amphiphilic molecule A-B in the dipping solution.

The group B provides the ultra-thin layer with its hydrophobic and oleophobic properties.

In embodiments where group B has partial or complete substitution with F, the group B is preferably a linear aliphatic alkyl group perfluorinated in its terminal section, e.g. with the formula

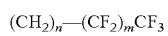

in which n is 1 to 5, particularly 1 to 3, and m is 4 to 11, particularly 5 to 9.

Groups A of interest are those selected from one of the following groups:

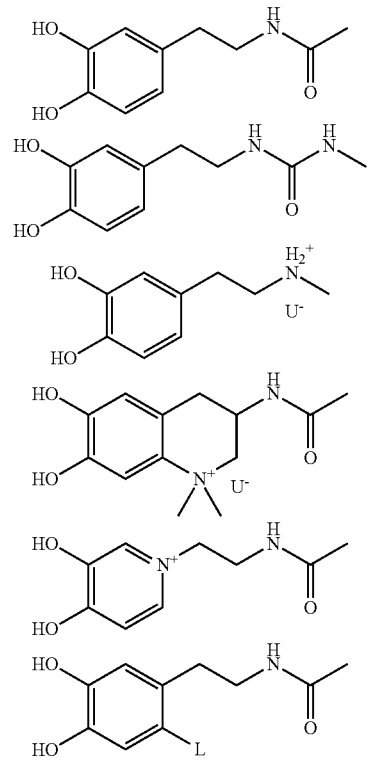

A particularly useful compound, for example, in embodiments where the group B has partial or complete substitution with F, is N-(3,4-dihydroxyphenethyl)-4,4,5,5,6,6,7,7,8,8,9,9,10,10,11,11,11-heptadecafluoro-undecanamide

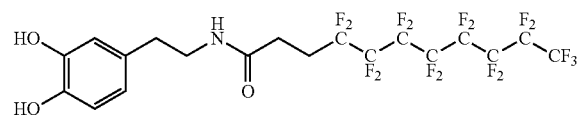 [SMILES: O=C(CCC(F)(F)C(F)(F)C(F)(F)C(F)(F)C(F)(F)C(F)(F)C(F)(F)C(F)(F)F)NCCc1ccc(O)c(O)c1]

(SuSoS2).

The compounds of formulae A-B can be obtained from known compounds using techniques and reactions well known to the organic chemist.

For example, 1-(3,4-dihydroxyphenethyl)-3-octadecylurea

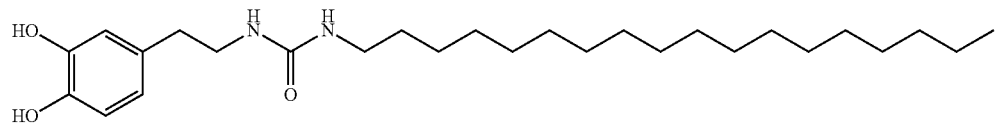 [SMILES: CCCCCCCCCCCCCCCCCCNC(=O)NCCc1ccc(O)c(O)c1]

(SuSoS1) can be obtained by reacting octadecyl isocyanate and 3-hydroxytyramine hydrochloride in solution in DMF in the presence of N-methylmorpholine.

For example, N-(3,4-dihydroxyphenethyl)-4,4,5,5,6,6,7,7,8,8,9,9,10,10,11,11,11-heptadecafluoro-undecanamide can be obtained by reacting N-succinimidyl 2H,2H,3H,3H-perfluoroundecanoate and 3-hydroxytyrosine hydrochloride in solution in DMF in the presence of N-methylmorpho line.

3-(4,4,5,5,6,6,7,7,8,8,9,9,10,10,11,11,11-Heptadeca-fluoroundecanamido)-6,7-dihydroxy-1,1-dimethyl-1,2,3,4-tetrahydroquinolinium

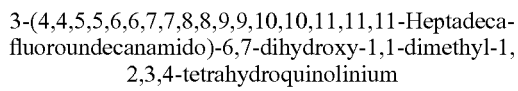

(SuSoS 3) can be prepared from ANACAT and N-succinimidyl 2H,2H,3H,3H-perfluoroundecanoic acid by processes similar to those described by Y. Bethuel, K. Gademann, *J. Org. Chem.* 2005, 70, 6258; Zürcher, S.; Wäckerlin, D.; Bethuel, Y.; Malisova, B.; Textor, M.; Tosatti, S.; Gademann, K. Journal of the American Chemical Society 2006, 128, 1064-1065.

1-(2-(4,4,5,5,6,6,7,7,8,8,9,9,10,10,11,11,11-Hepta-deca-fluoroundecanamido)ethyl)-3,4-dihydroxypyri-dinium

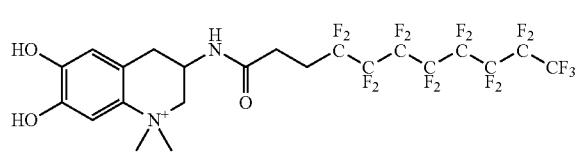 [SMILES: C[N+]1(C)CC(NC(=O)CCC(F)(F)C(F)(F)C(F)(F)C(F)(F)C(F)(F)C(F)(F)C(F)(F)C(F)(F)F)Cc2cc(O)c(O)cc21]

(SuSoS4) can also be prepared by processes similar to those mentioned above, from 1-(2-aminoethyl)-3,4-dihdyroxypy-ridinium and from N-succinimidyl 2H,2H,3H,3H-perfluo-roundecanoic acid.

N-(3,4-Dihydroxyphenethyl)-3,3,4,4,5,5,6,6,7,7,8,8,9,9,10,10,10-heptadecafluorodecan-1-aminium

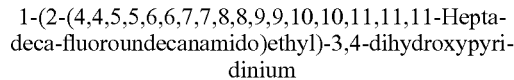

(SuSoS5) can also be prepared by processes similar to those mentioned above from 3-hydroxytyrosine hydrochloride and 1,1,1,2,2,3,3,4,4,5,5,6,6,7,7,8,8-heptadecafluoro-10-iodo-decane.

N-(4,5-Dihydroxy-2-nitrophenethyl)-4,4,5,5,6,6,7,7,8,8,9,9,10,10,11,11,11-heptadecafluoro-undecana-mide

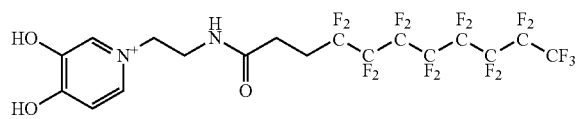 [SMILES: O=C(CCC(F)(F)C(F)(F)C(F)(F)C(F)(F)C(F)(F)C(F)(F)C(F)(F)C(F)(F)F)NCC[n+]1ccc(O)c(O)c1]

(SuSoS6) can also be prepared by processes similar to those mentioned above from 4-(2-aminoethyl)-5-nitro-benzene-1,2-diol and N-succinimidyl 2H,2H,3H,3H-perfluorounde-canoic acid.

The solid substrate on the surface of which the self-assembly takes place may be any solid substrate involved in the functioning of a mechanical movement, particularly composed of a material selected from gold, silver, steel, for example, 20AP steel, aluminium, brass, bronze, copper-beryllium, titanium dioxide, ruby, sapphire, in some embodiments, silicon, nickel and nickel phosphorus, as well as other metallic surfaces such as iron, chromium, tantalum, yttrium, silicon, germanium, copper, platinum, in some embodiments, nickel and nickel-phosphorus, and metal oxides or ceramics, such as zirconia and/or niobia (niobium oxide), this list being non-limitative. It is also possible to use as the substrate polymers such as polyethylenes, polystyrenes, polyamides, polydimethyl-siloxanes, polyvinyl chlorides or epoxy resins, this list also being non-limitative. The substrate may also be a substrate made of one of these materials or another, the surface of which has been covered or coated, for example by an electroplating of gold, of gold-copper-cadmium and of gold, of nickel, of rhodium, of tin-nickel, or treated by anodising, as in the case of parts made of aluminium alloy or titanium alloy, or modified by a surface treatment such as oxidation, carburisation or nitriding.

The thickness of the ultra-thin layer, measured by ellipsometry, is generally 0.5 to 10 nm, the upper value that will be used for the definition of ultra-thin, preferably 1 to 4 nm.

In order to be considered or effective as an epilame, i.e. satisfactorily to prevent the spread of oil, the advancing contact angle with water must generally be at least 100°. Also, a film having a contact angle that may be significantly less than 100°, for example from 90 to 100°, but which nevertheless prevents spread, which remains lower than 2%, will also be considered as an epilame.

The ultra-thin layer of formula A-B preferably remains effective as an epilame after two washing operations.

The invention also relates to a watchmaking or to a mechanical part characterised in that it comprises an ultra-thin layer as defined above.

The invention also relates to a method of preparing the ultra-thin layer defined above, characterised in that it comprises the immersion of the substrate in a solution of the compound of formula A-B, for example in water or a mixture of water and protic solvent such as, for example, 2-propanol, or a mixture of an aprotic solvent and a protic solvent such as 2-propanol. This method, in embodiments where it does not use any fluorinated solvent, is therefore environmentally friendly.

The invention will be better understood with the aid of the following examples, which are illustrative in nature and non-restrictive.

EXAMPLE 1A

Synthesis of 1-(3,4-dihydroxyphenethyl)-3-octadecylurea (SuSoS1)

Octadecyl isocyanate (668 mg, 2.26 mmol) was added dropwise to a solution of 3-hydroxytyramine hydrochloride (428 mg, 2.26 mmol) and N-methylmorpholine (372 μl) in DMF (5 ml). The mixture was stirred under a nitrogen atmosphere for 6 hours. Water (50 ml) was added and the white precipitate that formed was filtered and washed with water (10 ml) and acetone (10 ml). Recrystallisation from acetone (160 ml) at −20° C. gave 870 mg of white powder.

Molecular weight: 448.68%
% by weight: C, 72.28; H, 10.78; N, 6.24; O, 10.70
without H: C, 84.375; N, 6.25; O, 9.373
$^1$H NMR (DMSO-d6, 300 MHz, 300 K, ppm): 8.72 (s, 1H OH), 8.62 (s, 1H OH), 6.7-6.5 (m, 3H dopamine), 5.82 (t, 1H NH), 5.68 (t, 1H NH), 3.12 (q, 2H $CH_2$), 2.95 (q, 2H $CH_2$), 2.5 (m, 4H $CH_2$), 1.20 (m, 30H $CH_2$), 0.86 (t, 3H $CH_3$),
corresponding to 1-(3,4-dihydroxyphenethyl)-3-octadecylurea:

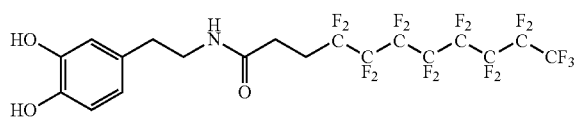 [SMILES: O=C(CCC(F)(F)C(F)(F)C(F)(F)C(F)(F)C(F)(F)C(F)(F)C(F)(F)C(F)(F)F)NCCc1ccc(O)c(O)c1]

EXAMPLE 2A

Preparation of Dipping Solutions and Immersion of Various Substrates Therein

Preparation of Dipping Solution of SuSoS1

23.4 mg of SuSoS1 (0.052 mmol) were dissolved in 80 ml of 2-propanol in a 100 ml graduated flask. The solution was subjected to ultrasound (using Sonorex Super 10 P equipment at 100%) until completely dissolved. Ultrapure water was added up to the mark on the flask and the solution was shaken vigorously, which caused an increase in the temperature of the solution. After the solution returned to ambient temperature, a few drops of water were added to adjust the volume to 100 ml. The solution was subjected to ultrasound for 10 seconds to degas it and to allow complete mixing of the water and the 2-propanol.

Immersion of Substrates of Gold, Polished Steel, Aluminium, Titanium Oxide and Ruby in the Dipping Solutions Experimental Protocol A1

The samples of gold, polished steel, aluminium, titanium oxide and ruby were cleaned in a UV/ozone chamber for 30 minutes and immersed overnight in the solution of SuSoS1. The samples were then immersed in 2-propanol for 10 seconds, rinsed with 2-propanol and dried with a nitrogen flow. In the case of steel, the surfaces were lightly polished with a cloth soaked in 2-propanol, rinsed with additional 2-propanol and dried with a nitrogen flow (see Table 1A below). Or Experimental Protocol B1

The same samples were immersed for 12 hours at ambient temperature in a solution of 0.5 mM of the molecule SuSoS1 in a mixture of heptane (96%) and 2-propanol (4%). The samples were rinsed with 2-propanol and dried under a flow of dry nitrogen (see Table 1B below).

EXAMPLE 1B

Synthesis of N-(3,4-dihydroxyphenethyl)-4,4,5,5,6,6,7,7,8,8,9,9,10,10,11,11,11-heptadecafluoro-undecanamide (SuSoS2)

Synthesis of N-succinimidyl 2H,2H,3H,3H-perfluoroundecanoate 2H,2H,3H,3H-Perfluoroundecanoic acid (1.354 g, 2.75 mmol), N-hydroxysuccinimide (348 mg, 3.02 mmol) and dicyclohexylcarbodiimide (622 mg, 3.02 mmol) were dissolved in ethyl acetate (120 ml) and stirred for 18 hours at ambient temperature. The white precipitate which formed (dicyclohexylurea, DCU) was filtered and the remaining solution was evaporated to dryness. The residue was recrystallised twice from ethyl acetate. Yield 1.00 g (62%) containing traces of DCU.

$^1$H NMR ($CDCl_3$, 300 MHz, ppm): 3.0 (m, 2H $CH_2$), 2.88 (s, 4H $CH_2$ NHS), 2.6 (m, 2H $CH_2$).

Synthesis of N-(3,4-dihydroxyphenethyl)-4,4,5,5,6,6,7,7,8,8,9,9,10,10,11,11,11-heptadecafluoro-undecanamide 3-Hydroxytyrosine hydrochloride (257.5 mg, 1.35 mmol) and N-methylmorpholine (241 μl) were dissolved in DMF (8 ml). The NHS perfluoro ester (800 mg) was added and the mixture was stirred under a nitrogen atmosphere overnight. Water (40 ml) was added and the precipitate that formed was filtered and washed with water. The solid was dissolved in ethyl acetate and the organic phase was dried with magnesium sulfate. The solvent was evaporated and the residue recrystallised from chloroform (30 ml, 4° C.). Yield 752 mg (88%).

Molecular weight: 627.29%
% by weight: C, 36.38; H, 2.25; F, 51.49; N, 2.23; O, 7.65
without H: C, 47.5; F, 42.5; N, 2.5; O, 7.5
$^1$H NMR ($CDCl_3$, 300 MHz, ppm): 8.7 (s broad, 2H OH), 8.08 (t, 1H NH), 6.7-6.4 (m, 3H dopamine), 3.2 (q, 2H $CH_2$), 2.7-2.3 (m, 6H $CH_2$), corresponding to N-(3,4-dihydroxyphenethyl)-4,4,5,5,6,6,7,7,8,8,9,9,10,10,11,11,11-heptadecafluoro-undecanamide

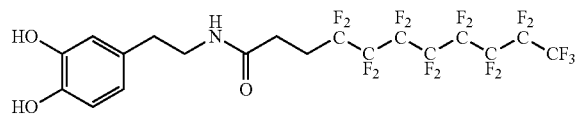 [SMILES: O=C(CCC(F)(F)C(F)(F)C(F)(F)C(F)(F)C(F)(F)C(F)(F)C(F)(F)C(F)(F)F)NCCc1ccc(O)c(O)c1]

EXAMPLE 2B

Preparation of Dipping Solutions and Immersion of Various Substrates Therein

Preparation of Dipping Solution of SuSoS2

33 mg of SuSoS2 (0.052 mmol) were dissolved in 35 ml of 2-propanol in a 100 ml graduated flask and shaken until completely dissolved. Ultrapure water was added up to the mark and the solution was again shaken vigorously, which caused an increase in the temperature of the solution. After the solution returned to ambient temperature, a few drops of water were added to adjust the volume to 100 ml. The solution was subjected to ultrasound for 10 seconds to degas it and to allow complete mixing of the water and the 2-propanol.

Immersion of Substrates of Gold, Polished Steel, Aluminium, Titanium Oxide and Ruby in the Dipping Solutions The samples of gold, polished steel, aluminium, titanium oxide and ruby were cleaned in a UV/ozone chamber for 30 minutes and immersed overnight in the solution of SuSoS2. The samples were then immersed in 2-propanol for 10 seconds, rinsed with 2-propanol and dried with a nitrogen flow. In the case of steel, the surfaces were lightly polished with a cloth soaked in 2-propanol, rinsed with additional 2-propanol and dried with a nitrogen flow.

EXAMPLE 3

Analysis of the Ultra-Thin Layers Formed by Self-Assembly on Various Substrates

The monolayers formed by self-assembly on the various substrates were analysed by
variable angle spectroscopic ellipsometry (VASE; cf. Feller et al. (2005), "Influence of poly(propylene sulfide-block-ethylene glycol) di- and triblock copolymer architecture on the formation of molecular adlayers on gold surfaces and their effect on protein resistance: A candidate for surface modification in biosensor research", Macromolecules 38 (25): 10503-10510,
dynamic contact angle measurement (dCA; cf. Tosatti et al. (2002) "Self-Assembled Monolayers of Dodecyl and Hydroxy-dodecyl Phosphates on Both Smooth and Rough Titanium and Titanium Oxide Surfaces", Langmuir 18(9): 3537-3548, as follows: the surface wettability was determined by measuring the advancing and the receding contact angles on a sessile drop (of water) (Contact Angle Measuring System, G2/G40 2.05-D, Krüss GmbH, Hamburg, Germany); the experiment was conducted automatically, increasing and reducing the size of the drop at a rate of 15 µl per minute; 480 values were measured for the advancing contact angle and 240 for the receding contact angle, at 3 different positions for each sample); the data collected were analysed using the tangent method 2 (adjustment routine of the prop-Shape Analysis program, version DSA 1.80.0.2 for Windows 9x/NT4/2000, (c) 1997-2002 KRUESS") and
X-ray spectroscopy (XPS; Tosatti et al. above).

The various substrates used are
plates of silicon covered with a fine layer of gold
disks of polished steel
disks of polished ruby
plates of aluminium
plates of silicon covered with a fine layer of titanium dioxide The main parameters measured by VASE and CA are compiled in Tables 1A, 1B and 1C below.

TABLE 1A

Thickness measured by ellipsometry and advancing contact angles with water (according to protocol A)

| Substrate | Modification | Thickness measured by ellipsometry [nm] | Advancing contact angle with water [°] |
| --- | --- | --- | --- |
| Gold | Clean | — | approx. 50 |
| | SuSoS1 | 1.0 | 93.4 ± 2.1 |
| Polished steel | Clean | — | <10 |
| | SuSoS1 | 2.7 | 108.5 ± 1.0 |
| Aluminium | Clean | not measured | <10 |
| | SuSoS1 | not measured | 98.8 ± 0.6 |
| Titanium dioxide | Clean | — | <10 |
| | SuSoS1 | 3.4 | 111.8 ± 0.7 |
| Ruby | Clean | not measured | <10 |
| | SuSoS1 | not measured | — |

TABLE 1B

Thickness measured by ellipsometry and advancing contact angles with water (according to protocol B)

| Substrate | Modification | Thickness measured by ellipsometry [nm] | Advancing contact angle with water [°] |
| --- | --- | --- | --- |
| Gold | Clean | — | approx. 50 |
| | SuSoS1 | not measured | 108 ± 4 |
| Polished steel | Clean | — | <10 |
| | SuSoS1 | not measured | 107 ± 1 |
| Aluminium | Clean | not measured | <10 |
| | SuSoS1 | not measured | 105 ± 2 |
| Titanium dioxide | Clean | — | <10 |
| | SuSoS1 | 2.9 | 112 ± 3 |
| Ruby | Clean | not measured | <10 |
| | SuSoS1 | not measured | 106 ± 1 |

Analysis by X-ray photoelectron spectroscopy (XPS) shows that the SuSoS1 molecules are present on all the surfaces by detection of the elements N.

These results show that an ultra-thin layer of SuSoS1 is obtained on all the substrates tested.

The advancing contact angle values with water are satisfactory for use as an epilame (greater than 100° or slightly less than this value but with spread values of less than 2% (as will be seen below).

TABLE 1C

Thickness measured by ellipsometry and advancing contact angles with water

| Substrate | Modification | Thickness measured by ellipsometry [nm] | Advancing contact angle with water [°] |
| --- | --- | --- | --- |
| Gold | Clean | — | approx. 50 |
| | SuSoS2 | 0.7 | 115.6 ± 0.8 |
| Polished steel | Clean | — | <10 |
| | SuSoS2 | 3.3 | 116.8 ± 2.5 |
| Aluminium | Clean | not measured | <10 |
| | SuSoS2 | not measured | 126.2 ± 1.9 |
| Titanium dioxide | Clean | — | <10 |
| | SuSoS2 | 1.4 | 116.5 ± 0.6 |
| Ruby | Clean | not measured | <10 |
| | SuSoS2 | not measured | 109.9 ± 2.1 |

Analysis by X-ray photoelectron spectroscopy (XPS) shows that the SuSoS2 molecules are present on all the surfaces by detection of the elements N and F.

These results show that an ultra-thin layer of SuSoS2, whose thickness, measured by ellipsometry, does not correspond exactly to the expected thickness of a well-ordered monolayer, is obtained on all the substrates tested.

The advancing contact angle values with water are satisfactory for use as an epilame (greater than 100°).

EXAMPLE 4A

Comparison of Ultra-Fine Layers Formed by Self-Assembly of SuSoS1 and Fixodrop FK-BS on Surfaces of Gold, Polished Steel and Ruby 1) Preparation of Ultra-Fine Layers of SuSoS1 and Fixodrop on the Surfaces of the Various Substrates Surfaces of substrates of gold, polished steel and ruby are covered with an ultra-fine layer of SuSoS1 as described in example 2A. The surface appearance is excellent and no mark resulting from the deposit can be distinguished.

Surfaces of substrates of gold, polished steel and ruby are covered with an ultra-fine layer of Fixodrop FK-BS in accordance with the manufacturer's instructions by dipping the substrates in a solution of tetradeca-fluorohexane.

The thickness of this layer measured by ellipsometry on gold is 1.0 nm for SuSoS1 and 1.7 nm for Fixodrop.

2) Measurement of Lubricant Spread

The spread of lubricants on a surface is characterised by measuring the average diameter of a drop of typically 0.5 mm in diameter immediately after depositing the drop and after 20 minutes. The spread corresponds to the relative variation in the average diameter after 20 minutes. A good lubricant behaviour corresponds to a spread of 2% or less. A spread greater than 10% can be observed by the naked eye and is not acceptable. The oil used for the tests is a watchmakers' oil "941" (Moebius et Fils, mixture of alkyl-aryl-monooleate and two $C_{10}$-$C_{13}$ diesters, viscosity of 110 cSt at 20° C., surface tension of 32.8 mN/m).

The spread obtained on surfaces of steel, ruby, aluminium, titanium dioxide and gold coated with the SuSoS1 molecule, and a gold surface coated with the commercial product Fixodrop FK-BS from Moebius et Fils in accordance with the manufacturer's instructions, is compared. For the SuSoS1 molecule, the spread is less than 2% in all cases and is comparable to that measured for Fixodrop, as shown by the table below.

TABLE 2A

| | Lubricant spread | |
|---|---|---|
| Surface | Ultra-thin layer | Moebius 941 oil |
| Steel | SuSoS1 | −0.04% |
| Aluminium | SuSoS1 | +1.29% |
| Titanium dioxide | SuSoS1 | +0.23% |
| Ruby | SuSoS1 | −0.97% |
| Gold | SuSoS1 | +0.09% |
| Gold | Fixodrop FK-BS | −0.90% |

3) Conclusion

For all the surfaces investigated, the contact angle obtained on the ultra-thin layers formed with the SuSoS1 molecule is greater than 100°, the surface energy is less than 20 mJ m$^{-2}$ and the spread is less than 2%.

The layers exhibit good resistance to washing treatments on ruby, aluminium and titanium dioxide but less good on gold and steel.

The properties of the ultra-thin SuSoS1 layer are at least as good as those obtained with the commercial product Fixodrop.

EXAMPLE 4B

Comparison of Ultra-Fine Layers Formed by Self-Assembly of SuSoS2 and Fixodrop FK-BS on Surfaces of Gold, Polished Steel and Ruby 1) Preparation of Ultra-Fine Layers of SuSoS2 and Fixodrop on the Surfaces of the Various Substrates Surfaces of substrates of gold, polished steel and ruby are covered with an ultra-fine layer of SuSoS2 as described in example 2B. The surface appearance is excellent, especially for gold and ruby; the layer is invisible and no mark resulting from the deposit can be distinguished.

Surfaces of substrates of gold, polished steel and ruby are covered with an ultra-fine layer of Fixodrop FK-BS in accordance with the manufacturer's instructions by dipping the substrates in a solution of tetradeca-fluorohexane.

The thickness of this layer measured by ellipsometry on gold is 0.7 nm for SuSoS2 and 1.7 nm for Fixodrop.

2) Measurement of Contact Angles with Different Solvents and Determination of Surface Energies The advancing contact angles with water, hexadecane, diiodomethane and ethylene glycol were measured by dynamic contact angle measurement using a goniometric technique similar to that used in example 3.

The dispersive and polar components of the surface energy were deduced from these measurements using the Owens-Wendt model (Owens D. K. and Wendt R. C., 1969, Journal of Applied Polymer Science, 13, 8, p. 1741).

The main results obtained are compiled in table 2B below.

TABLE 2B

| | Contact angles and surface energies with various solvents | | | |
|---|---|---|---|---|
| Liquid | Steel SuSoS2 | Ruby SuSoS2 | Gold SuSoS2 | Gold Fixodrop |
| Contact angle [°] | | | | |
| Hexadecane | 64.1 | 56.8 | 47.3 | 56.8 |
| Diiodomethane | 90.4 | 84.4 | 77.8 | 78.0 |
| Ethylene glycol | 93.2 | 87.2 | 84.9 | 88.4 |
| Water | 103.0 | 113.8 | 104.8 | 104.2 |
| Surface energy [mJ/m$^2$] | | | | |
| Dispersive | 12.5 | 16.3 | 18.6 | 16.8 |
| Polar | 2.2 | 0.2 | 0.8 | 0.4 |
| Total | 14.6 | 16.6 | 19.4 | 17.3 |

For gold, steel and ruby, the contact angles with water, hexadecane, diiodomethane and ethylene glycol are acceptable for use as an epilame, and comparable with those measured for Fixodrop.

For gold, steel and ruby, the layer formed with SuSoS2 exhibits only a dispersive nature, as expected for a molecule of this type. The surface energy seems to vary with the material, but is in all cases less than 20 mJ/m$^2$. The lowest energy (and therefore in principle the best behaviour) is obtained for steel, followed by ruby and gold.

3) Measurement of Lubricant Spread

The spread of lubricants on a surface is characterised by measuring the average diameter of a drop of typically 0.5 mm in diameter immediately after depositing the drop and after 20 minutes. The spread corresponds to the relative variation in the average diameter after 20 minutes. A good lubricant behaviour corresponds to a spread of 2% or less. A spread greater than 10% can be observed by the naked eye and is not acceptable. The oils used for the tests are a watchmakers' oil "941" (Moebius et Fils, mixture of alkyl-aryl-monooleate and two $C_{10}$-$C_{13}$ diesters, viscosity of 110 cSt at 20° C., surface tension of 32.8 mN/m) and a CESNIII test oil (Laboratoire Suisse de Recherches Horlogéres, silicone oil, surface tension of 23.1 mN/m, "La Suisse Horlogére" No 43, Jul. 11, 1974).

The spread obtained on surfaces of steel, ruby and gold coated with the SuSoS2 molecule, and a gold surface coated with the commercial product Fixodrop FK-BS from Moebius et Fils in accordance with the manufacturer's instructions, is compared. For the SuSoS2 molecule, the spread is less than 1% in all cases and is comparable to that measured for Fixodrop, as shown by the table below.

TABLE 3

| Surface | Ultra-thin layer | Moebius 941 oil | CESNIII oil |
| --- | --- | --- | --- |
| Steel | SuSoS2 | 0.11% | 0.92% |
| Ruby | SuSoS2 | 0.37% | 0.46% |
| Gold | SuSoS2 | 0.30% | 0.14% |
| Gold | Fixodrop FK-BS | −0.90% | 0.86% |

4) Conclusion

For all the surfaces investigated, the contact angle obtained on the ultra-thin layers formed with the SuSoS2 molecule is greater than 100°, the surface energy is less than 20 mJ m$^{-2}$ and the spread is less than 1%.

The layers display good resistance to washing treatments on ruby, but less good on gold and steel.

The properties of the ultra-thin SuSoS2 layer are equivalent to, or at least as good as, those obtained with the commercial product Fixodrop, and a solvent that is environmentally friendly may be used.

The invention claimed is:

1. An ultra-thin hydrophobic and oleophobic layer, formed by self-assembly on a solid substrate surface, of compounds of the formula

A-B in which
A represents a group of the formula

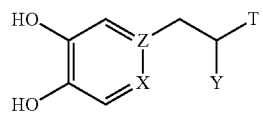

in which
Z represents C or N$^+$,
X represents C—H or C-L, L being an electron-attracting group selected from F, Cl, Br, I, CF$_3$, NO$_2$ and N(CH$_3$)$_3^+$,
Y represents H or CH$_3$, or Y forms a 5- or 6-atom heterocycle with X, T represents NH, CO, CONH or NH$_2^+$U$^-$, U$^-$ being a soluble anion, and B represents a C$_1$-C$_{20}$ linear aliphatic alkyl group partially or completely substituted with F.

2. An ultra-thin layer as claimed in claim 1, wherein B is a linear aliphatic alkyl group perfluorinated in its terminal section, having the formula (CH$_2$)$_n$—(CF$_2$)$_m$CF$_3$ in which n is from 1 to 5 and m is from 4 to 11.

3. An ultra-thin layer as claimed in claim 2, wherein n is from 1 to 3 and m from 5 to 9.

4. An ultra-thin layer as claimed in claim 1, wherein A is selected from one of the following groups:

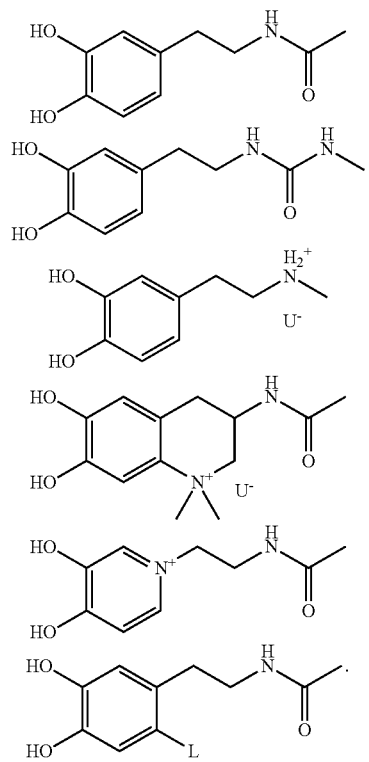

5. An ultra-thin layer as claimed in claim 1, wherein it is obtained from N-(3,4-dihydroxyphenethyl)-4,4,5,5,6,6,7,7,8,8,9,9,10,10,11,11,11-heptadecafluoroundecanamide.

6. An ultra-thin layer as claimed in claim 1, wherein the solid substrate is composed of a material selected from gold, silver, steel, aluminium, brass, bronze, copper-beryllium, titanium dioxide, ruby, sapphire, silicon, nickel, nickel phosphorus, iron, chromium, tantalum, yttrium, germanium, copper, platinum, metal oxides, ceramics, and polymers.

7. An ultra-thin layer as claimed in claim 6, wherein the solid substrate comprises a ceramic selected from zirconia and niobia (niobium oxide).

8. An ultra-thin layer as claimed in claim 6, wherein the solid substrate comprises a polymer selected from polyethylenes, polystyrenes, polyamides, polydimethylsiloxanes, polyvinyl chlorides, and epoxy resins.

9. An ultra-thin layer as claimed in claim 6, wherein a surface of the substrate has been at least one of (i) covered or coated by an electroplating of gold, of gold-copper-cadmium and of gold, of nickel, of rhodium, of tin-nickel, (ii) treated by anodising, and (iii) modified by a surface treatment.

10. An ultra-thin layer as claimed in claim 9, wherein the surface of the substrate has been modified by a surface treatment selected from oxidation, carburisation and nitriding.

11. An ultra-thin layer as claimed in claim 1, wherein its advancing contact angle with water is at least 100°.

12. An ultra-thin layer as claimed in claim 1, wherein its thickness measured by ellipsometry is from 0.5 to 10 nm.

13. A mechanical part, wherein it comprises an ultra-thin layer as claimed in claim 1.

14. A mechanical part according to claim 13, which is a watchmaking part.

15. A method of preparing an ultra-thin layer as claimed in claim 1, wherein it comprises the immersion of the substrate in a solution of the compound of formula A-B in water or a mixture of water and protic solvent.

16. A method as claimed in claim 15, wherein the protic solvent is 2-propanol.

17. Method of providing a barrier film to a substrate, comprising providing an ultra-thin layer as claimed in claim 1.

18. Method of providing a barrier film as claimed in claim 17, wherein the barrier film is an epilame provided to a watchmaking part.

19. An ultra-thin layer as claimed in claim 1, wherein T represents $NH_2^+U^-$, $U^-$ being a soluble anion selected from the group consisting of $F^-$, $Cl^-$, $Br^-$, $I^-$, $OH^-$, $NO_3^-$, $HSO_4^-$, $SO_4^{2-}$, $CO_3^{2-}$, $HCO_3^-$ and $SCN^-$.

20. An ultra-thin hydrophobic and oleophobic layer, formed by self-assembly on a solid substrate surface, of compounds of the formula

A-B

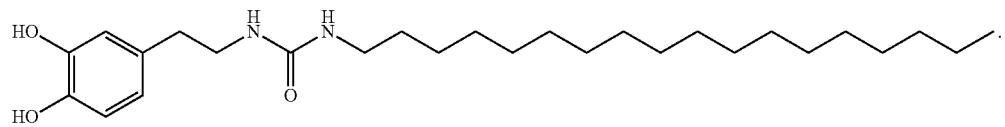

in which
A represents a group of the formula

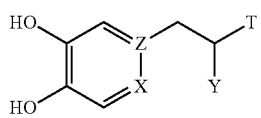

in which
Z represents C or $N^+$,
X represents C—H or C-L, L being an electron-attracting group selected from F, Cl, Br, I, $CF_3$, $NO_2$ and $N(CH_3)_3^+$,
Y represents H or $CH_3$, or Y forms a 5- or 6-atom heterocycle with X,
T represents NH, CO, CONH or $NH_2^+U^-$, $U^-$ being a soluble anion, and B represents an unsubstituted $C_1$-$C_{20}$ linear aliphatic alkyl group.

21. An ultra-thin layer as claimed in claim 20, wherein A is selected from one of the following groups:

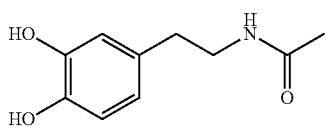

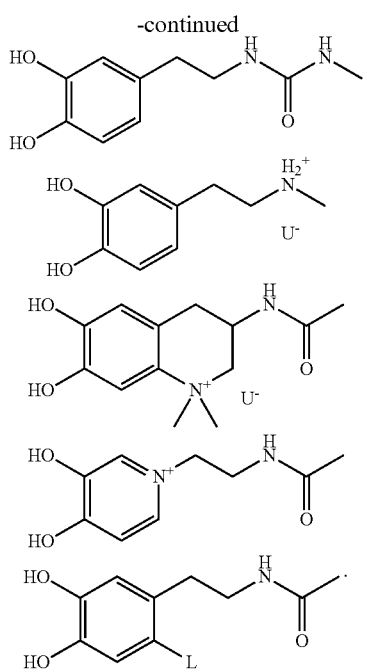

22. An ultra-thin layer as claimed in claim 20, characterised by a compound of the following formula:

23. An ultra-thin layer as claimed in claim 20, wherein the solid substrate is composed of a material selected from gold, silver, steel, aluminium, brass, bronze, copper-beryllium, titanium dioxide, ruby, sapphire, silicon, nickel, nickel phosphorus, iron, chromium, tantalum, yttrium, germanium, copper, platinum, metal oxides, ceramics, and polymers.

24. An ultra-thin layer as claimed in claim 23, wherein the solid substrate comprises a ceramic selected from zirconia and niobia (niobium oxide).

25. An ultra-thin layer as claimed in claim 23, wherein the solid substrate comprises a polymer selected from polyethylenes, polystyrenes, polyamides, polydimethylsiloxanes, polyvinyl chlorides, and epoxy resins.

26. An ultra-thin layer as claimed in claim 23, wherein a surface of the substrate has been at least one of (i) covered or coated by an electroplating of gold, of gold-copper-cadmium and of gold, of nickel, of rhodium, of tin-nickel, (ii) treated by anodising, and (iii) modified by a surface treatment.

27. An ultra-thin layer as claimed in claim 26, wherein the surface of the substrate has been modified by a surface treatment selected from oxidation, carburisation and nitriding.

28. An ultra-thin layer as claimed in claim 20, wherein its advancing contact angle with water is at least 100°.

29. An ultra-thin layer as claimed in claim 20, wherein its thickness measured by ellipsometry is from 0.5 to 10 nm.

30. A watchmaking part, wherein it comprises an ultra-thin layer as claimed in claim 20.

31. A method of preparing an ultra-thin layer as claimed in claim 20, wherein it comprises the immersion of the substrate in a solution of the compound of formula A-B in water or a mixture of water and protic solvent.

32. A method as claimed in claim 31, wherein the protic solvent is 2-propanol.

33. A method of preparing an ultra-thin layer as claimed in claim 20, wherein it comprises the immersion of the substrate in a solution of the compound of formula A-B in a mixture of aprotic solvent and protic solvent.

34. Method of providing an epilame to a watchmaking substrate, comprising providing an ultra-thin layer as claimed in claim 20.

35. An ultra-thin layer as claimed in claim 20, wherein T represents $NH_2^{+U}$, $U^-$ being a soluble anion selected from the group consisting of $F^-$, $Cl^-$, $Br^-$, $I^-$, $OH^-$, $NO_3^-$, $HSO_4^-$, $SO_4^{2-}$, $CO_3^{2-}$, $HCO_3^-$ and $SCN^-$.

* * * * *

UNITED STATES PATENT AND TRADEMARK OFFICE
CERTIFICATE OF CORRECTION

| | | |
|---|---|---|
| PATENT NO. | : 8,951,630 B2 | Page 1 of 1 |
| APPLICATION NO. | : 13/323773 | |
| DATED | : February 10, 2015 | |
| INVENTOR(S) | : Samuele Tosatti et al. | |

It is certified that error appears in the above-identified patent and that said Letters Patent is hereby corrected as shown below:

In the Claims

Col. 17, lines 12-15, Claim 35, please change

"An ultra-thin layer as claimed in claim 20, wherein T represents $NH_2^{+U31}$, U$^-$ being a soluble anion selected from the group consisting of F$^-$, Cl$^{31}$, Br$^-$, I, OH$^-$, NO$_3^-$, HSO$_4^{31}$, SO$_4^{2-}$, CO$_3^{2-}$, HCO$_3^{31}$ and SCN$^{31}$."

To be

-- An ultra-thin layer as claimed in claim 20, wherein T represents $NH_2^+U^-$, U$^-$ being a soluble anion selected from the group consisting of F$^-$, Cl$^-$, Br$^-$, I, OH$^-$, NO$_3^-$, HSO$_4^-$, SO$_4^{2-}$, CO$_3^{2-}$, HCO$_3^-$ and SCN$^-$. --

Signed and Sealed this
Second Day of February, 2016

Michelle K. Lee
*Director of the United States Patent and Trademark Office*